Jan. 25, 1966  D. E. LAWSON  3,231,458
MOLDED WOOD CHIP ARTICLE AND METHOD OF MAKING THE SAME
Filed Aug. 7, 1961
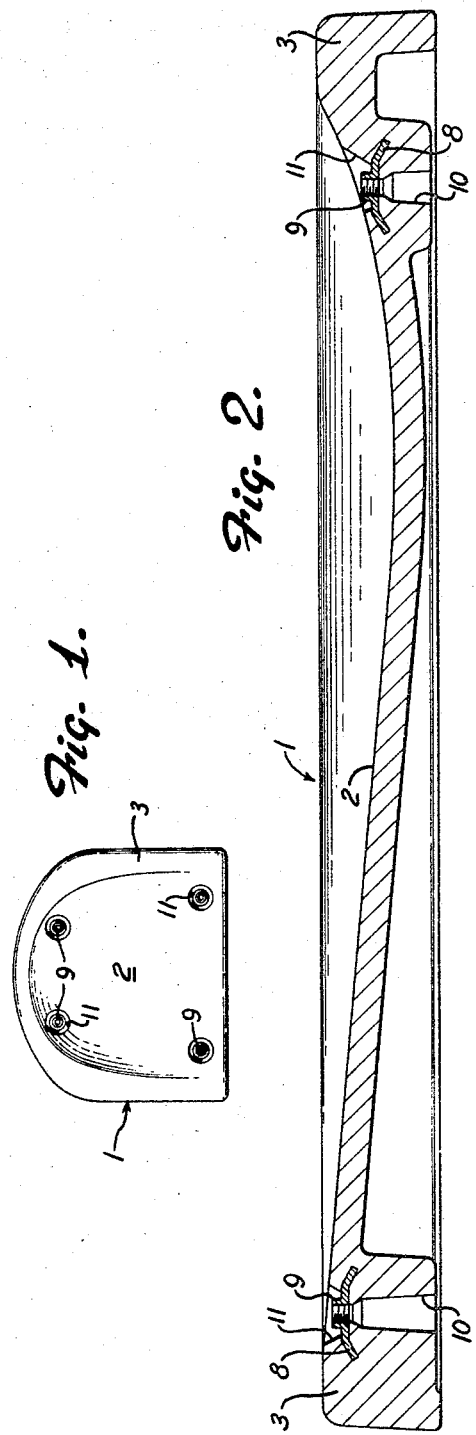
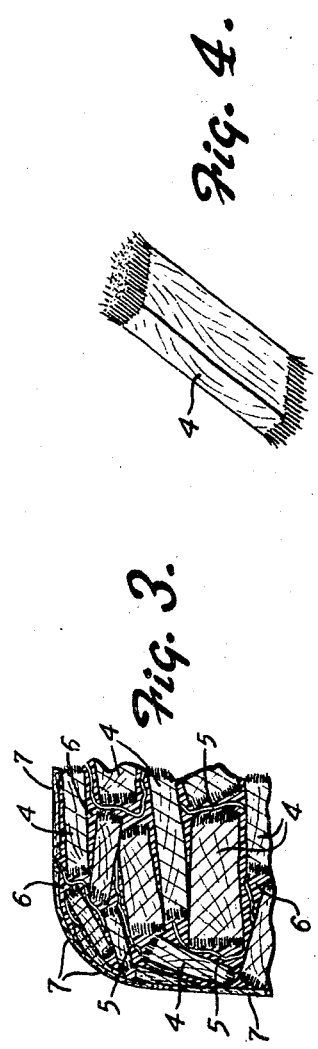
INVENTOR.
David E. Lawson
BY
Andrus & Starke
Attorneys

United States Patent Office 3,231,458
Patented Jan. 25, 1966

3,231,458
MOLDED WOOD CHIP ARTICLE AND METHOD
OF MAKING THE SAME
David E. Lawson, 2021 Middleton Beach Road,
Middleton, Wis.
Filed Aug. 7, 1961, Ser. No. 129,736
8 Claims. (Cl. 161—162)

This invention relates to a molded wood chip article and more particularly to an article formed of wood chips bonded with resin which has improved physical properties.

In the past, a wide variety of wood products, such as panels, boards, contoured articles and the like, have been formed of various wood particles bonded together by adhesives. Wood particle boards which have strength characteristics comparable to wood generally lack nail holding ability, while wood particle boards having ability to hold nails generally have substantially lesser physical properties than wood. The present invention is directed to a molded wood chip article having improved physical properties and nail holding ability and which can readily be molded into contoured shapes. More specifically, the article consists of a mixture of wood chips and reinforcing fibers which are bonded together at an elevated temperature and pressure by a thermosetting resin.

According to the invention, the wood chips to be used in the composition are initially subjected to the action of a hammer mill and forced through a ⅜" to ⅝" mesh screen. The hammer milling serves to fray the ends of the chips and the frayed ends provide an increased bond with other fiber reinforcement and the resin matrix to provide a molded article having greater strength and other physical properties.

In the process of the invention, the hammer milled wood chips are initially thoroughly mixed with a fibrous reinforcing material, such as glass fibers, and the mixture is then impregnated or coated with a liquid, uncured thermosetting resin. The resin-coated chips and fibers are then disposed within a suitable die and molded at high pressures and temperatures to form the desired article. The invention is particularly adaptable to fabricating contour articles having different thicknesses and surface contours. As the resin-coated wood chips and fibers have appreciably no flow under the pressure conditions, an article can be formed having a variation in density and physical properties in the single molding operation. This enables the thin portions or sections of a contoured article to be molded with substantially greater strength than the thicker portions with the result that the overall physical characteristics of the article are improved.

Other objects and advantages will appear in the course of the following description.

The drawings illustrate the best mode presently contemplated of carrying out the invention.

In the drawings:

FIGURE 1 is a plan view of a molded seat fabricated in accordance with the present invention;

FIG. 2 is a sectional view taken along line 2—2 of FIG. 1;

FIG. 3 is an enlarged sectional view showing the wood chips, fibers and resin bond in the article; and FIG. 4 is an enlarged perspective view of a hammer milled wood chip.

The drawings illustrate a molded contoured seat 1 having a generally thin, concave central portion 2 and thick peripheral flange 3. The central portion 2 and flange 3 are formed of a mixture of wood chips 4 and fibers 5 which are bonded together by a cured thermosetting resin 6.

If the seat 1 is to be used as an external element, a thin layer of wood flakes 7 can be employed in the outer layers to improve the appearance thereof. The flakes 7, being generally thin and flat, provide a more uniform and pleasing external appearance for the article. If, however, the seat 1 is to be used as an internal frame member where appearance is not essential, the layer of flakes 7 can be eliminated.

To provide attachment for legs or other supporting structure, a plurality of inserts 8 are embedded within the flange 3. The inserts are generally circular in shape and have downwardly extending peripheral edges. The central portion of each insert is provided with an internally threaded boss 9 which is adapted to threadedly receive a leg or other supporting member, not shown. Openings 10 and 11 are provided in the lower surface and upper surface of the flange 3 and provide access to the threaded boss 9.

The peripheral flange 3 is provided with a substantial thickness or depth and has a specific gravity in the range of 0.75 to 1.20. With a specific gravity in this range the peripheral flange is relatively light in weight which reduces the overall weight of the seat, and the flange has excellent nail holding ability. This nail holding ability enables coverings or upholstery to be readily put over the seat and to be anchored or nailed to the peripheral flange 3.

The central portion 2 has a considerably lesser thickness than the flange 3 and has a higher specific gravity in the range of 1.0 to 1.5 to provide greater strength for the central portion. As the central portion 2 has a substantially lesser thickness than the peripheral flange 3 and yet has a greater strength, the overall strength characteristics of the seat are improved.

The wood chips 4 generally have a size such that they will not pass through a ¼" mesh screen and yet will be forced or driven by a hammer mill through a ⅜" to ⅝" mesh screen. The wood chips are generally elongated with the long dimension being parallel to the wood grain and in most cases the long dimension is considerably greater than ⅜" to ⅝" and generally within the range of ½" to 1". The wood chips are treated by introducing the chips into a hammer mill having a plurality of hammers or tines which rotate within a generally cylindrical, perforated or screen-like drum. The hammers flail the chips and drive them through the screen with the result that the larger chips are broken up into smaller chips and the ends of the chips are frayed, as shown in FIG. 4, so that the individual fibers in the wood chips are exposed at the ends of the chips. Generally, the exposed portion of the fibers at each end of the chip measures about ¹⁄₃₂" to ⅛".

It is important that no fines or small particles be included with the chips for small particles such as sawdust or wood flour tend to soak up the resin and increase the weight of the article.

The chips are formed from a wood having a specific gravity in the range of 0.30 to 0.50 and include such woods as fir, cedar, basswood, aspen, pine and the like.

The chips are employed in the article in an amount of 35% to 60% by weight with about about 50% being preferred. In addition, if reinforcing fibers 5 are to be employed, the fibers are used in an amount of 3% to 20% of the total weight of the chips and fibers, with a chip to fiber weight ratio of 4:1 to 8:1 being preferred.

The reinforcing fibers 5 may be any common fiber which will not absorb or soak up the resin and may take the form of ceramic fibers such as glass, mineral fibers such as asbestos, synthetic fibers and the like. The fibers are orientated randomly throughout the article and are intertwined with the wood chips and the frayed ends thereof to provide additional reinforcement and securely bond or lock the components together.

The fibers generally have a length of 1" to 3" with a length of 1¼" being preferred. Fibers longer 3" may tend to ball up in the mixing apparatus when the fibers are mixed with the wood chips, and if the fibers are shorter than 1", they tend to separate or segregate from the chips so that a uniform mixture is not obtained. In some applications where strength is not important, the fibers can be eliminated.

The resin to be employed as a binder can be any of the conventional thermosetting resins such as polyester, epoxy, urea, formaldehyde, melamine and the like. To coat the chips and fibers, the resin is generally employed in the form of a solvent solution in which the resin is dissolved in an evaporable solvent such as acetone or the like. The resin is generally used as a 20% to 35% solution and this solvent solution is then applied to the chips and fibers to coat the same. After evaporation of the volatile solvent, the resin remains as a tacky film or coating in an amount of 20% to 50% of the composition.

It is important that the resin merely coat the chips and flakes and not soak or impregnate the same, for soaking or impregnation of the chips requires an increased quantity of resin and results in a more dense product which decreases the nailability.

The flakes which can be employed in the outer layer of the article provide a stronger skin, a better appearance and a higher resin content in the outer layer.

The flakes are formed of wood having a specific gravity in the range of 0.30 to 0.50 and generally from soft woods, such soft maple, fir, cedar, basswood, pine, aspen and the like. To provide satisfactory flakes the wood should have a moisture content of 25% or greater at the time of flaking. The flakes are thinner than the chips, having a thickness less than 1/64" and having a surface area of about 1" x 1". The grain of the flakes runs parallel to the flat surfaces.

In the process of carrying out the invention, wood chips are cut from the desired types of wood by suitable chipping machines. The chips are then subjected to the action of a hammer mill and forced through a cylindrical drum-like screen with a mesh size of ⅜" to ⅝". The hammer milling breaks up the size of the larger chips and frays the ends of the chips.

The chips are then dried by subjecting the chips to a flow of warm air. It is important that the chips be dried to a moisture content less than 8.0% in order to prevent cracking of the finished molded article. Green wood has a moisture content of about 25%. If a wood of this moisture is employed, it has been found that after the pressing operation the steam developed will tend to be expelled through the article causing small cracks or crevices. Therefore it is important that the chips and flakes be dried to a moisture content less than 8.0% by weight.

The hammer milling is preferably carried on before drying, because if the chips were in the dried state, the hammer milling will tend to produce excessive dust and fines.

The dried, hammer milled chips are then mixed with fibers in a suitable mixing apparatus, such as that described in the copending application Serial No. 18,129, filed March 28, 1960, and now U.S. Patent No. 3,024,500 of the same inventor. The small wood particles and fines having a mesh size less than ¼" are removed in this process. After the chips and fibers are suitably mixed, the dry mix is mixed with a resin solution in an apparatus similar to that described in the copending application of the same inventor, Serial No. 23,764, filed April 21, 1960, and now abandoned. The excess resin solution is drained from the dry mixture and the solvent is then evaporated to leave a coating of resin on the fibers and wood chips. In this form the chips and fibers are a relatively tacky mass.

If the article to be molded is to be employed as an external element the mold is initially lined with a layer of flakes coated with resin in a manner similar to that in which the chips were coated. The metal inserts 8 are disposed on the female die and held above the upper surface of the die by pins or bosses. The resin coated chips and fibers are then introduced into the die and packed beneath and around the metal inserts. A second pin is engaged with the boss 9 and extends upwardly through the layer of chips and after molding, the second pin is removed and provides the opening 11 in the flange 3.

The article is molded by generally applying pressure in the range of 250 to 430 p.s.i. to the wood chips and fibers. This pressure is generally applied for a period of about 3 to 8 minutes and a temperature of 250° F to 350° F. is employed in order to cure the resin. With a pressure in this range, the resulting article will have a specific gravity in the range of 0.75 to 1.20, thereby providing the article with excellent nail holding characteristics. If the specific gravity is below 0.75 the article will lack the desired physical properties, while if the specific gravity is above 1.20 the strength of the article will be increased but the toughness and nail holding ability will be correspondingly decreased.

As the resin coated chips and fibers have no appreciable flow under pressure, it is possible to mold articles having a variation in density and physical properties. For example, when molding the seat as shown in the drawings, if a substantially uniform layer of the resin coated mixture is applied to all surfaces of the female die, the layer of material in the seat portion 2 will be compressed to a substantially greater degree than the quantity of material in the flange 3 with the result that the specific gravity and the compressive strength of the seat portion 2 is greater than that of the flange 3 but the nailability of the flange 3 is substantially greater than that of the seat portion 2.

This variation in density and physical properties can also be achieved when using dies which close to a uniform clearance. By employing a layer of wet mix of different thickness or depth, the areas of greater depth will be compressed to a greater extent than the areas of lesser depth with the result that the areas of greater depth will have a higher specific gravity in the range of 1.2 to 1.5 and greater strength, while the areas which were of lesser depth would be compressed to a lesser degree and have a specific gravity in the range of 0.75 to 1.20 and have better nailability.

The use of the hammer milled chips provides improved physical properties for the molded article because the frayed ends of the chips tend to lock with the reinforcing fibers and resin to provide a better bond between the components.

Various types of metal or other reinforcing members can be readily molded within the article and thereby serve as an attachment for external supports, legs, mountings or the like.

As the resin coated wood chips and fibers have appreciably no flow under pressure, articles having variable density and physical properties can be readily molded by the use of the invention.

The molded wood chip articles are less susceptible to moisture absorption than other wood particle boards. And when molded with a specific gravity of 0.75 to 1.20 will hold nails and other fasteners better than natural wood.

While the above description is directed to molding a seat, it is contemplated that articles of any shape and size may be molded. The invention is particularly adaptable to molding contoured articles such as bowling pins, picture frames, furniture frame components, outdoor sign letters, bowling alley equipment, and the like.

Various modes of carrying out the invention are contemplated as being within the scope of the following claims particularly pointing out and distinctly claiming the subject matter regarded as the invention.

I claim:

1. A molded article of contoured shape, comprising a plurality of hammer milled wood chips having a size larger than ¼" mesh and having a size smaller than ⅝" mesh and being free of wood particles having a size smaller than ¼" mesh, said wood chips having frayed ends with the individual fibers of the wood being exposed at said ends, a plurality of reinforcing fibers separate from said individual fibers of wood and haphazardly arranged with respect to the wood chips, and a thermosetting resin binder coating the fibers and the wood chips and serving to bond the same together as an integral structure, said article comprising from 35% to 60% by weight of said wood chips, 3% to 20% by weight of said reinforcing fibers and 20% to 50% by weight of said resin and said article having a specific gravity of 0.75 to 1.20.

2. The structure of claim 1, in which the exposed portion of the individual fibers of the wood has a length in the range of 1/32" to ⅛".

3. The structure of claim 1 in which the wood chips have a moisture content less than 8%.

4. The structure of claim 1 and including a supporting member having mounting means embedded within the article and disposed to receive an external support.

5. A molded wood chip article of contoured shape, comprising from 35% to 60% by weight of wood chips, said wood chips having frayed ends with the individual fibers of the wood exposed at the ends of said chips, said chips being free of wood particles having a size smaller than ¼" mesh, about 3 to 20% by weight of glass fibers haphazardly arranged within the article and coacting with the frayed ends of the chips to tie the chips together, said glass fibers being present in the weight ratio of 4 to 8 parts of wood chips to 1 part of fibers, and about 20 to 50% by weight being a thermosetting resin bonding the wood chips and glass fibers together as an integral structure, said article having a specific gravity in the range of 0.75 to 1.20 and having physical properties similar to natural wood and nailability substantially greater than natural wood.

6. A molded article of contoured shape, comprising from 35 to 60% by weight of hammer milled wood chips having a size larger than ¼" mesh and having a size smaller than ⅝" mesh and being free of wood particles having a size smaller than ¼" mesh, said wood chips having a specific gravity in the range of 0.3 to 0.5 and having frayed ends with the individual fibers of the wood being exposed in an amount of 1/32" to ⅛", about 3 to 20% by weight of reinforcing fibers haphazardly arranged with respect to the wood chips with said reinforcing fibers having a length in the range of 1 to 3 inches, and 20 to 50% by weight of a thermosetting resin binder coating the wood chips and reinforcing fibers and serving to bond the same together as an integral structure, said molded article having a specific gravity in the range of 0.75 to 1.20 and having physical properties similar to natural wood and nailability substantially greater than wood.

7. A method of forming a molded article of contoured shape, comprising the steps of hammer milling a plurality of wood chips and forcing the chips through a screen having a mesh size in the range of ⅜" to ⅝" to thereby fray the ends of said chips and expose the individual wood fibers at said ends, mixing the chips with a plurality of reinforcing fibers, coating the chips and fibers with an uncured thermosetting resin, applying a layer of the coated wood chips and fibers to a surface of a die with said layer having one portion of a given depth and a second portion of a greater depth than said first portion, engaging a second die with said layer, applying a substantially uniform pressure throughout the entire area of said second die to compress and mold said layer into the article with said first portion being compressed to provide said first portion with a specific gravity in the range of 0.75 to 1.20 and said second portion being compressed to a greater degree to provide said second portion with a specific gravity of 1.0 to 1.5.

8. A method of forming a molded wood chip article, comprising the steps of hammer milling a plurality of wood chips having a specific gravity in the range of 0.3 to 0.5 and forcing the chips through a screen having a mesh size in the range of ⅜" to ⅝" to thereby fray the ends of said chips and expose individual wood fibers at said ends, drying the wood chips to a moisture content of less than 8% by weight, removing the wood particles having a size smaller than ¼" mesh from said chips, haphazardly mixing a plurality of reinforcing fibers having a length in the range of 1 to 3 inches with said chips, coating the chips and reinforcing fibers with an uncured thermosetting resin to provide a molding composition, and molding the composition into the desired contoured shape under the pressure of 250 to 450 p.s.i. and a temperature of 250 to 350° F.

References Cited by the Examiner
UNITED STATES PATENTS

| | | | |
|---|---|---|---|
| 2,446,304 | 8/1948 | Roman | 18—47.5 |
| 2,487,218 | 11/1949 | Brinkmann | 264—274 |
| 2,642,371 | 6/1953 | Fahrni | 161—162 |
| 2,719,328 | 10/1955 | Patton et al. | 18—47.5 |
| 2,826,522 | 3/1958 | Mattson | 161—246 |
| 3,004,878 | 10/1961 | Tomlinson | 264—122 |
| 3,021,244 | 2/1962 | Meiler | 156—62.2 |

FOREIGN PATENTS

| | | |
|---|---|---|
| 1,011,675 | 4/1952 | France. |
| 589,076 | 6/1947 | Great Britain. |
| 767,584 | 2/1957 | Great Britain. |

EARL M. BERGERT, *Primary Examiner.*

UNITED STATES PATENT OFFICE
CERTIFICATE OF CORRECTION

Patent No. 3,231,458 January 25, 1966

David E. Lawson

It is hereby certified that error appears in the above numbered patent requiring correction and that the said Letters Patent should read as corrected below.

Column 3, line 2, after "longer" insert -- than --; line 30, after "such" insert -- as --; column 6, line 36, for "450" read -- 430 --.

Signed and sealed this 17th day of January 1967.

(SEAL)
Attest:

ERNEST W. SWIDER
Attesting Officer

EDWARD J. BRENNER
Commissioner of Patents